United States Patent [19]

Ycas et al.

[11] Patent Number: 5,673,157
[45] Date of Patent: Sep. 30, 1997

[54] INTEGRAL BASE PLATE/SPIN MOTOR ASSEMBLY WITH TAPED COVER

[75] Inventors: John A. Ycas; Stefan J. Malek, both of Boulder; Wayne G. Soderfelt, Westminster, all of Colo.

[73] Assignee: Fujitsu Limited, Kanagawa, Japan

[21] Appl. No.: 439,113

[22] Filed: May 11, 1995

Related U.S. Application Data

[62] Division of Ser. No. 333,945, Nov. 11, 1994, abandoned, which is a continuation of Ser. No. 966,311, Oct. 26, 1992, abandoned.

[51] Int. Cl.$^6$ ..................................... G11B 17/00
[52] U.S. Cl. ............................................. 360/97.01
[58] Field of Search ........................... 360/97.01, 97.02, 360/97.03, 98.01, 98.07, 98.06; 439/67, 77; 361/748, 749

[56] References Cited

U.S. PATENT DOCUMENTS

| | | | |
|---|---|---|---|
| 4,900,958 | 2/1990 | Kitahara et al. | 360/98.06 |
| 4,923,406 | 5/1990 | Bucknam | 439/77 |
| 5,021,905 | 6/1991 | Sleger | 360/97.02 |
| 5,025,335 | 6/1991 | Stefansky | 360/97.01 |
| 5,025,336 | 6/1991 | Morehouse et al. | 360/97.02 |
| 5,081,552 | 1/1992 | Glaser et al. | 360/98.01 |
| 5,097,978 | 3/1992 | Eckerd | 220/315 |
| 5,276,577 | 1/1994 | Brooks et al. | 360/97.02 |

*Primary Examiner*—Stuart S. Levy
*Assistant Examiner*—Allen Cao
*Attorney, Agent, or Firm*—Curtis Morris & Safford, P.C.

[57] ABSTRACT

A rotary disk storage system is provided for use with portable or laptop computers which is designed to achieve an overall maximum height ("Z-height") not greater than 17 mm. In attaining this result, the top cover and lower base plate of the housing of this rotary disk storage system are sealed by a pressure sensitive adhesive which permits the top cover to "float" on the lower base plate. Moreover, the reduced overall height is attained by forming the spin motor which rotates the magnetic disks integrally with the lower base plate. Further, IC chips are mounted on the printed circuit board to provide signal processing to a host computer, these IC chips being mounted on one side of the printed circuit board to face the lower base plate of the disk storage system. When the rotary disk storage system of the present invention is assembled, each of these IC chips is accommodated within differentially-sized pockets formed in the bottom surface of the lower base plate.

24 Claims, 3 Drawing Sheets

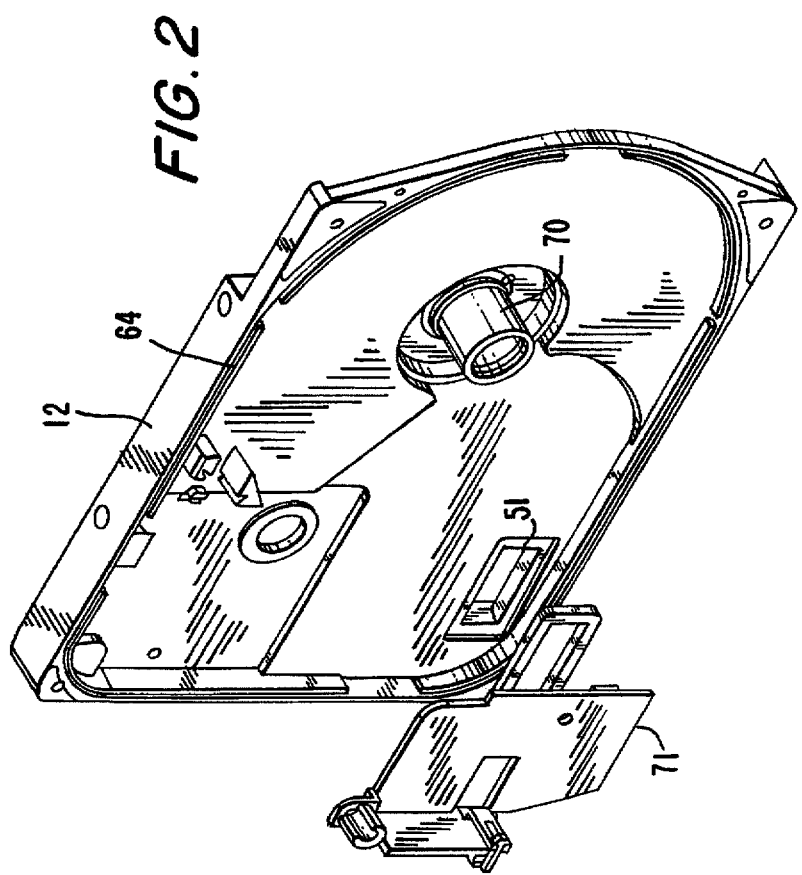
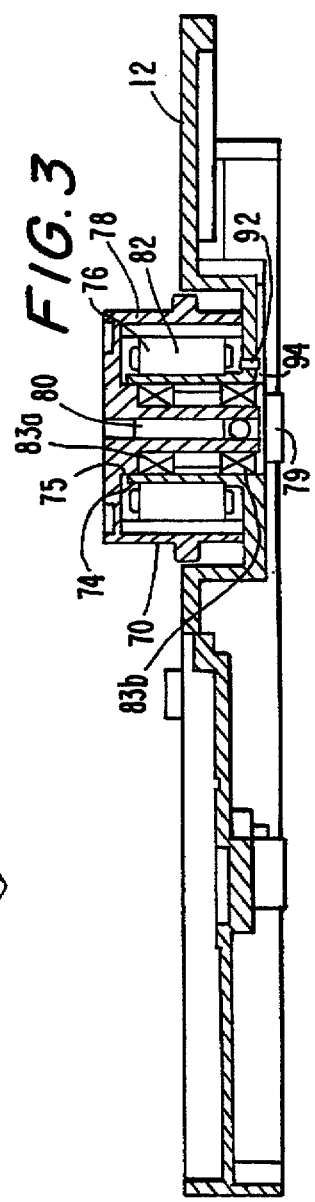

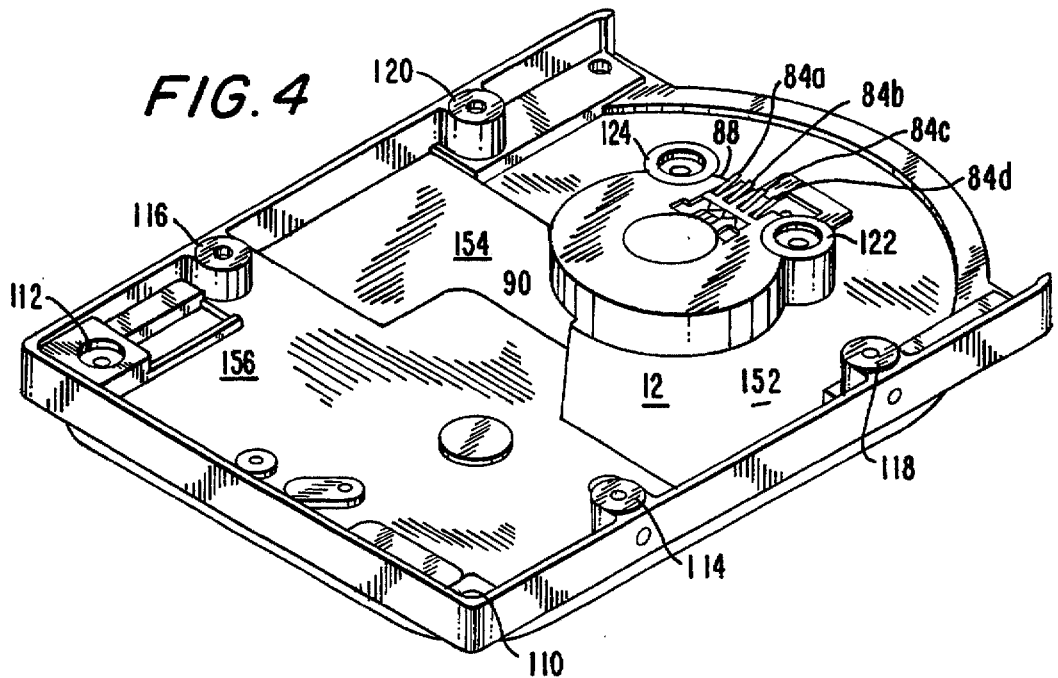
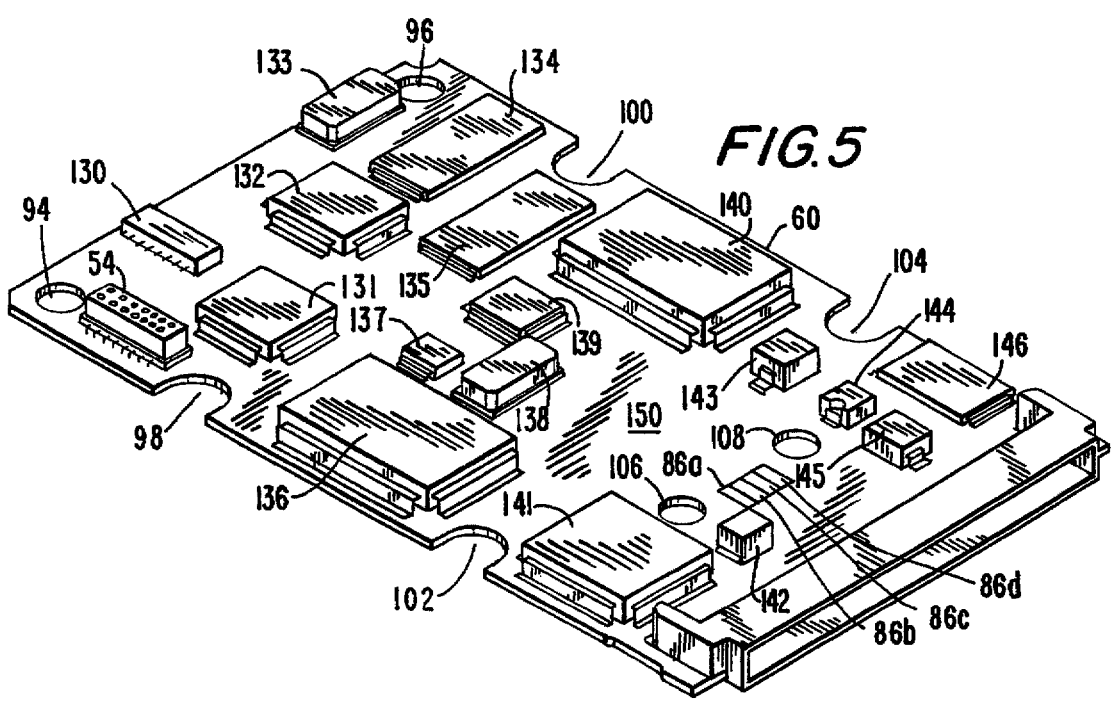

INTEGRAL BASE PLATE/SPIN MOTOR ASSEMBLY WITH TAPED COVER

This application is a division of application Ser. No. 08/333,945 filed Nov. 11, 1994, abandoned, which is a continuation application of prior application Ser. No. 07/966,311, filed on Oct. 26, 1992, now abandoned.

1. Field of the Invention

The present invention is generally directed to disk storage systems, and more particularly, is directed to a disk storage system which includes an integral base plate/spin motor assembly with taped cover which reduces the overall Z-height of the disk storage system.

2. Background of the Invention

Disk drive systems have been used to store information for computers for many years. With the advent of laptop computers and the progressive reduction in size of portable computers, there is an increasing demand for reducing the size of disk drive systems while at the same time increasing the memory capacity thereof.

The disk storage systems of the prior art are typically in the form of a rectangular housing which has predetermined size dimensions. For instance, the standard package height for a 3 ½ Winchester disk drive system has been set by the industry at approximately 1". This package height of the disk drive system is known in the disk drive art as the "Z-height".

Further reductions in the size of disk drive systems have been fostered by the introduction of laptop computers. As, for example, is discussed in U.S. Pat. No. 4,933,785, a hard disk utilized in a disk storage system employed in laptop computers has a diameter of approximately 2.5 inches. However, the overall Z-height of the disk drive system of U.S. Pat. No. 4,933,785 remained unchanged at approximately 1".

While utilizing approximately 2.5" diameter hard disks, U.S. Pat. No. 5,025,336 discloses a disk drive system having an overall Z-height which is less than 1". In order to attain this result, the disk drive system of this patent reduces the height dimension of the spin motor (i.e. the motor which rotates the disks) by reducing the height of the permanent magnets which produce a magnetic field which causes the rotor assembly of the spin motor to rotate. The height of the permanent magnets utilized in U.S. Pat. No. 5,025,336 is reduced by employing magnets made of a material that includes a rare earth, such as neodymium or samarium. Utilization of these materials, however, is disadvantageous as they add significant overall expense and are not readily available for mass production. Further, as is discussed below, this disk drive system still employs conventional mechanical fasteners to secure the spin motor to the lower plate.

In order to reduce the Z-height of a disk drive system, prior designs have primarily focused, in part, on the means for securing the top cover to the lower base plate of the housing as well as the means for joining the spin motor to the lower base plate. For instance, in one data storage system (i.e., the data storage system in U.S. Pat. No. 5,021,905), the top cover enclosing the disk drive environment is screwed to the lower base plate of the disk drive housing. It has been found, however, that screwing the top cover to the lower base plate of the disk drive housing results in warping and distortion of the head disk assembly due to the imperfect mating of parts. Due to this imperfect mating of parts, positional offset errors of the magnetic heads can often result.

Further, mechanical fasteners, screws, clips, etc. which have been traditionally used to fasten the top cover to the lower base plate have been difficult for fully automated assembly operations to properly handle. It has therefore been found desirable to provide a disk storage system wherein the top cover is sealed to the lower base plate in a manner which reduces or eliminates warping or distortion of the head disk assembly caused by misregistered parts, which at the same time is conducive to automated assembly.

As aforementioned, in order to reduce the Z-height of the disk drive system, previous designs have focused on the means for attaching the spin motor to the lower base plate. In prior disk drive systems, the spin motor assembly is typically mechanically fastened to the lower base plate by various means, such as by screws, glue or press-fitting. For instance, in U.S. Pat. Nos. 4,814,913 and 5,025,336, the spin motor assembly is screwed to the lower base plate. It has been found, however, that mechanically fastening the spin motor to the lower base plate has led to disadvantages in the areas of contamination generation, sealing between parts, and the introduction of residual and transient stresses into the base plate. It has therefore been found desirable to provide a disk storage system which eliminates the necessity of joining a separate spin motor and base plate, and in turn, eliminates fasteners, gluing or press-fitting operations associated with joining separate components.

OBJECTS OF THE INVENTION

Therefore, it is a general object of the present invention to provide a disk storage system which the avoids the above-described deficiencies of the prior art.

It is another general object of the present invention to provide a disk storage system having a Z-height less than 1".

It is also an object of the present invention to provide a disk storage system wherein the Z-height is no greater than approximately 17 mm.

It is another object of the present invention to provide a disk storage system wherein the top cover mates with the lower base plate in a manner which reduces or eliminates warping or distortion of the head disk assembly due to mating of imperfect parts.

It is a further object of the present invention to provide a disk storage system wherein the top cover is sealed to the lower base plate in a manner which eliminates temperature and mounting stresses.

It is yet another object of the present invention to provide a disk storage system wherein the top cover is sealed to the lower base plate in a manner which is conducive to automated assembly.

It is yet a further object of the present invention to provide a disk storage system which does not mechanically join the spin motor to the lower base plate.

It is still a further object of the present invention to provide a disk storage system wherein the spin motor and lower base plate are "joined" in a manner which reduces contamination generation, undesired sealing between parts, and residual and transient stresses introduced into the base plate.

It is yet a still further object of the present invention to provide a disk storage system wherein the spin motor and lower base plate are integrally formed.

These and other objects, aspects and features of the present invention will become apparent from the following detailed description of a preferred embodiment thereof taken in conjunction with the accompanying drawings, throughout which like reference numerals denote like elements and parts.

SUMMARY OF THE INVENTION

In accordance with an aspect of the present invention, a rotary disk storage system is provided for use with portable or laptop computers which is designed to achieve an overall maximum height ("Z-height") not greater than 17 mm. In this rotary disk storage system, an actuator carriage or arm is mounted within a housing for rotary travel in a plane. The actuator carriage pivots so as to position at least one read/write head having a maximum height of not greater than 0.024 inches at a desired track on a corresponding magnetic disk, which is preferably a hard disk having a diameter of approximately 2.5 inches. A spin motor is also provided for rotating the magnetic disk(s) within the housing. The actuator carriage is preferably of the so-called rotary voice coil motor ("VCM") type and is driven when current flows through the VCM. A printed circuit board ("PCB") has electronic components mounted thereon to provide signal processing between this rotary disk storage system and a host computer.

In accordance with one of the general objects of the present invention, the housing of the rotary disk storage system of the present invention includes a top cover which is sealed to the lower base plate in a manner which reduces or eliminates warping or distortion of the head disk assembly due to mating of imperfect parts. The top cover is mechanically isolated from the lower base plate as these two components of the housing are mated together by a tape seal. Preferably, this tape seal is a high performance, pressure sensitive adhesive formed of a Mylar strip which permits the top cover to "float" on the lower base plate in a manner which eliminates temperature and mounting stresses. In order to assist the tape seal in properly aligning the top cover with respect to the lower base plate, the lower plate includes a flanged lip extending upwardly therefrom which is aligned with an outer peripheral wall of said top cover such that the top cover is properly positioned to float on the lower plate.

The reduced Z-height of the rotary disk storage system of the present invention is also attained, in part, by the spin motor not being mechanically joined to the lower base plate. In this rotary disk storage system, the spin motor is formed integrally with the lower base plate.

In order to electrically connect the spin motor to the printed circuit board upon which motor control circuiting is mounted, the spin motor assembly includes spring finger connections projecting outwardly and downwardly from the lower base plate which contact corresponding contact pads embedded in the printed circuit board that is mounted to the base plate. These spring finger connections are seated in a recess provided on the bottom surface of the lower base plate. The spring finger connections provide signal communication to the spin motor by electrical connections which extend through openings formed in the lower base plate.

The cooperative arrangement of the printed circuit board and the lower base plate herein also assists the rotary disk storage system of the present invention in attaining a reduced Z-height. In achieving this result, the printed circuit board has a maximum overall thickness of not greater than 0.040 inches and the signal components or IC chips formed on the printed circuit board are formed on the side thereof which faces the base plate. When the rotary disk storage system of the present invention is assembled, each of these IC chips is accommodated within pockets provided on the underside of the lower base plate.

In summary, advantageous features of this rotary disk storage system allow it to attain a reduced Z-height when assembled. These features include, but are not limited to, the following: tape sealing the top cover to the lower base plate; integral spin motor/base plate assembly; Z-height of the magnetic heads (0.024"); flat pack, surface mount and single side mounting of IC chips on the printed circuit board; IC chips are mounted on the printed circuit board to face the base plate and are accommodated in pockets formed in the lower base plate; and thickness of the printed circuit board (0.040") and the maximum height of each IC chip mounted on the printed circuit board (0.9 mm).

BRIEF DESCRIPTION OF THE DRAWINGS

The following detailed description, given by way of example, but not intended to limit the invention solely to the specific embodiments described, may best be understood in conjunction with the accompanying drawings in which:

FIG. 2 is a perspective view illustrating the lower base plate of the rotary disk storage system of FIG. 1 having the magnetic disks, actuator assembly and flexible circuit removed therefrom.

FIG. 3 is a cross-sectional elevational view of the lower base plate of FIG. 2 specifically illustrating the integrally formed spin motor/base plate assembly.

FIG. 4 is a perspective view illustrating the bottom side of the lower base plate of FIG. 2.

FIG. 5 is a front perspective view of the printed circuit board used in conjunction with the rotary disk storage system of FIG. 1.

DETAILED DESCRIPTION OF A PREFERRED EMBODIMENT

Figure 1:
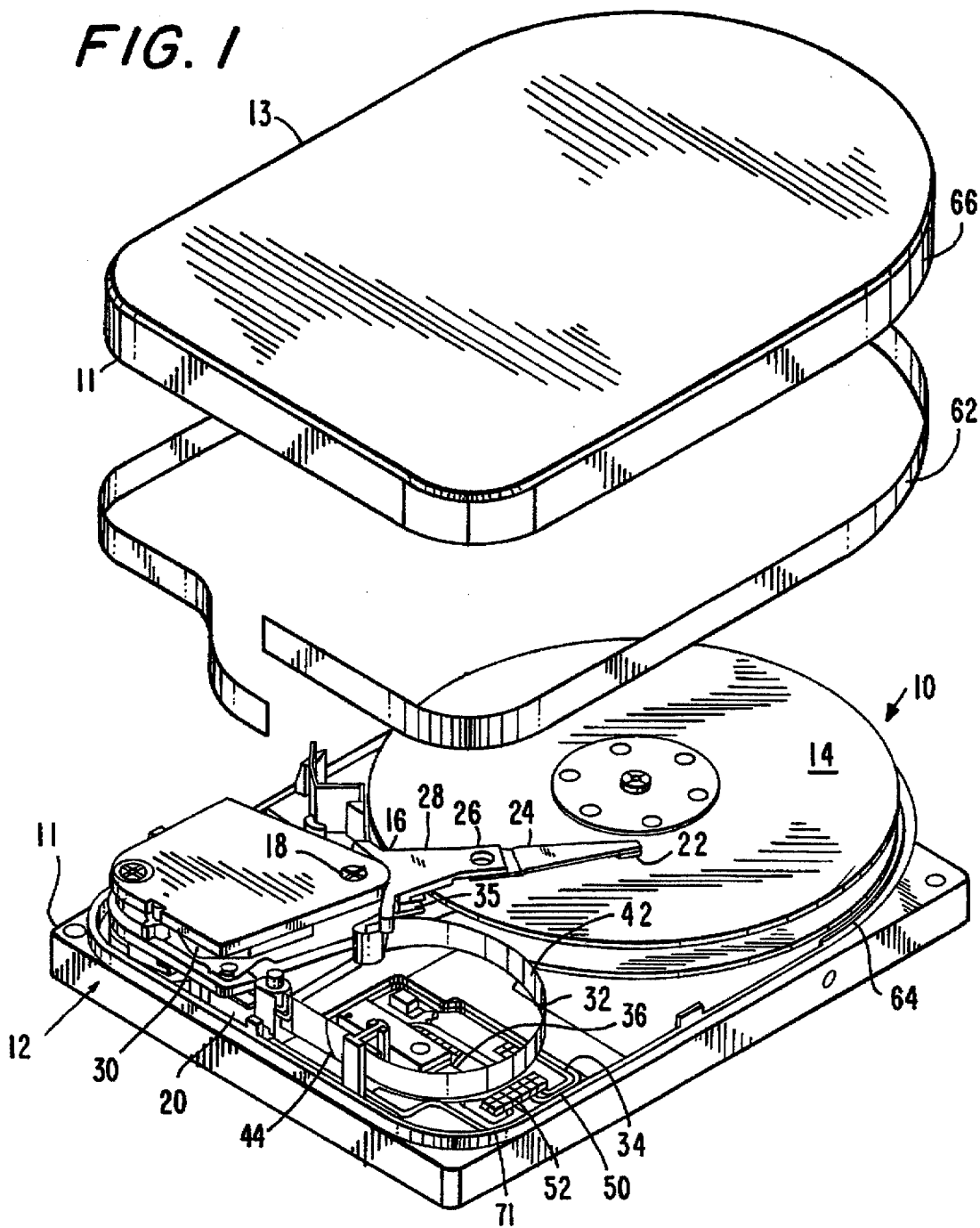
FIG. 1 is an exploded perspective view of the rotary disk storage system of the present invention specifically illustrating the top cover of the housing being sealed to the lower base plate thereof by a tape seal.

Referring now to the drawings and initially to FIG. 1 thereof, a preferred embodiment of a rotary disk storage system for use with portable or laptop computers which is designed to achieve an overall maximum height ("Z-height") not greater than 17 mm is illustrated. Although the present invention will be described in the context of a hard disk drive system using a rotary head actuator carriage, it will be understood that the present invention may be applied to hard disk drive systems using linear head actuator carriages or other compatible information storage systems.

As is shown in FIG. 1, the hard disk drive system 10 has an outer housing 11 formed of a lower base plate 12 and a top cover 13 between which the data storage disk(s) 14, actuator assembly 16 and other components of the data storage system are contained. Preferably, each of the magnetic disk(s) 14 has a diameter of approximately 2.5 inches. Further, in the illustrative embodiment, an actuator spindle 18 is mounted on an actuator base plate 20 which permits pivotal movement of the actuator assembly 16.

In order to store information on and read information from the data storage disk(s) 14, a plurality of heads, such as head 22, are supported on the actuator assembly. These heads are designed to have a maximum overall height of approximately 0.024 inches and are adapted to write data onto respective disks 14 and read data from the disks. Each head 22 is supported by a flexure element 24 which extends from the distal end 26 a respective arm 28 of an actuator carriage.

An actuator motor 30 is mounted on the actuator carriage, the motor including permanent magnets (not shown) fixed on the actuator base plate 20 and a coil sandwiched therebetween and secured to the actuator carriage. The coil and the permanent magnets comprise a voice coil motor ("VCM") which produces a force of predetermined varying amounts determined by the current supplied to the coil. In response to this force, the actuator carriage is driven in clockwise or counterclockwise directions about spindle 18 to move the heads 22 across the disk surfaces between the outer and inner diameters of the disks to overlie a selected one of the substantially circular concentric tracks of the data storage portion of the disk on which data may be recorded or read.

In a hard or Winchester disk storage system employing a rotary actuator, a flexible circuit typically interconnects the read/write heads and the actuator coil to controlling and signal processing electronics for providing communication therebetween. In one preferred embodiment of the present invention, as is shown in FIG. 1, the flexible circuit includes a single flexlead 32 which has separate signal traces for supplying power and ground to the VCM, for coupling servo signals from the read/write heads 22 and for transmitting data signals to and from the read/write heads. The flexible circuit terminates at an end 44 in a printed circuit 50 having respective connecting traces 34 and 36 electrically connected to separate signal traces formed on flexlead 32.

As is further shown in FIG. 1, the flexlead is mounted at an opposite end 35 thereof to the actuator assembly 16 and as the flexlead extends away from the actuator assembly, a loop 42 is formed. The end 44 of the loop 42 of the flexlead 32 opposite to the end 35 mounted to the actuator assembly is electrically joined to mating circuitry on the printed circuit 50. This printed circuit 50 is formed on a flexible substrate 71 made of plastic or plastic-like material which is snap-fit to the lower base plate 12 of the housing 11 to thereby not only support printed circuit 50 within housing 11, but also provide mechanical support for the flexible circuit.

Although not shown in FIG. 1, the substrate 71 includes a plurality of clips extending downwardly therefrom which form a snap fitting. These clips are received and snap-fit within a receiving opening 51 of the lower base plate 12 to reliably mount printed circuit 50 within the housing (see FIG. 2). In the retained and latched position, leads of the multi-pin connector 52 extend through to the underside of substrate 71 so as to be joined to mating connections 54 on the printed circuit board ("PCB") 60 (see FIG. 5) of the disk drive system. This PCB 60 provides signal processing for signals communicated between the rotary disk storage system and a host computer.

In order to reduce and/or eliminate warping or distortion of the head disk assembly due to mating of imperfect parts, namely lower base plate 12 and top cover 13, and to seal the disk drive environment from contaminants, the top cover 13 is sealed to the lower base plate 12 by a tape seal 62 (see FIG. 1). This tape seal is preferably a high performance, pressure-sensitive polyethylene tape in the form of a Mylar strip which permits the top cover 13 to "float" on lower base plate 12 in a manner which eliminates temperature and mounting stresses. Thus, a "floating" cover is provided which sits on the lower base plate 12 and is neither screwed nor rigidly connected to the lower base plate 12.

In order to assist the tape seal 62 in properly aligning top cover 13 with lower base plate 12, the lower plate 12 includes a flanged lip 64 extending upwardly therefrom and surrounding the disks 14, actuator assembly 16 and substrate 71. This flanged lip 64 mates with an outer peripheral wall 66 depending downwardly from the top cover 13. The tape seal 62 is adhesively applied to the flanged lip 64 and outer peripheral wall 66 of the top cover 13. As a result thereof, the tape seal 62 conforms to the flanged lip and the outer peripheral wall such that tolerances between the top cover and lower base plate can be increased, which, in turn, reduces machining costs of those two components.

Accordingly, there is no interaction in the rotary disk drive system of the present invention between the top cover 13 and the lower base plate 12, and therefore, warping or distortion of head positions due to misregistered parts is significantly reduced and/or eliminated. Moreover, the taping procedure is also advantageous as it is relatively simple to perform and is of relatively low cost.

In order to achieve a reduced Z-height of not greater than 17 mm, the rotary disk storage system of the present invention includes a spin motor 70 which is not mechanically joined to the lower base plate 12. As is shown in FIGS. 2 and 3, a spin motor 70, used to rotate disks 14, is formed integrally with the lower base plate 12. As a result of this integrally-formed spin motor/base plate assembly, fasteners or gluing operations necessary to join separate spin motors and lower base plates of the prior art have been eliminated.

More specifically, as is best shown in FIG. 3, the integral spin motor/base plate assembly includes a hollow stator hub 74 formed integrally with the lower base plate 12 and electrical windings 76 positioned on the outer surface of the hub. The spin motor 70 further includes a cup-shaped rotor assembly 78 having a rotary shaft 80 which is positioned in the hollow hub 74. Further, permanent magnets 82, preferably annularly formed, are mounted on the inner surface of the cup-shaped rotor which produce a magnetomotive force of predetermined varying amounts determined by the current supplied to the windings 76. Annular bearings, such as 83a and 83b, are mounted between the outer surface of the stator hub assembly 74 and rotary shaft 80 of the rotor assembly to assist in rotation of the rotor assembly.

In order to electrically connect spin motor 70 to the printed circuit board 60, the integral spin motor/base plate assembly includes spring finger connections, such as 84a, 84b, 84c, and 84d (see FIG. 4), projecting annularly downwardly from the outer surface of lower base plate 12. These finger projections contact respective contact pads 86a, 86b, 86c, and 86d embedded in the printed circuit board 60 (see FIG. 5). These spring finger connections 84a, 84b, 84c and 84d are seated in a recess 88 formed in the bottom surface 90 of the lower base plate and provide signal communication to the spin motor assembly via electrical connections 92 which extend through openings 94 formed in the lower base plate 12 (see FIG. 3). Hence, drive signals may be coupled therethrough to spin motor 70.

Due to this integral spin motor/base plate assembly design, not only is the overall height of the drive reduced, but also contamination problems and unwanted residual and transient stresses that otherwise would be introduced into the lower base plate because of the separate construction of the spin motor and the base plate are alleviated. Assembly costs are also reduced as the motor placement step has been eliminated.

In order to assemble the printed circuit board 60 to lower base plate 12, the printed circuit board 60 includes openings 94, 96, 98, 100, 102, 104, 106, and 108 which are aligned with respective mating fastener mounts 110, 112, 114, 116, 118, 120, 122, and 124 formed in lower base plate 12. Although not shown, fasteners extend through the openings into the fastener mounts provided in the lower babe plate to tightly retain the printed circuit board 60 to the lower base plate 12 such that the spring finger connections 84a, 84b, 84c, and 84d are in good electrical contact with the contact pads 86a, 86b, 86c and 86d.

The cooperative arrangement of the printed circuit board 60 and the lower base plate 12 as assembled also contributes to the reduced Z-height of the rotary disk storage system of the present invention. The printed circuit board 60 employs flat pack, surface mount technology and is of a relatively thin construction having a maximum overall thickness of not greater than 0.040 inches. Moreover, all of signal components and IC chips, such as connector 54 and IC chips 130-146, are formed on one side 150 of the printed circuit board 60 (see FIG. 5) which faces the lower base plate 12.

Further reduction in the overall Z-height is attained by the formation of pockets, such as pockets 152, 154 and 156, stamped into the bottom (or outer) surface 90 of the lower base plate (see FIG. 4). When assembled, each of the signal components and IC chips 54 and 130-146 is accommodated within a respective one of pockets 152, 154, or 156 based upon the height of the signal component or IC chip. For the purposes of illustration, the thickest IC chips 140, 141, and 145 are accommodated within the deepest pocket 152. The next deepest pocket 154 accommodates IC chips, such as 136, which are not as thick as signal components 152, 154 and 156. Finally, the shallowest pocket 156 accommodates relatively thin IC chips, such as 131, 132, 134 and 135.

As is set forth above, the rotary disk storage system of the present invention includes features which enable the system to attain a maximum overall Z-height of not greater than 17 mm. These features include, but are not limited to: tape sealing the top cover to the lower base plate; the integral spin motor/base plate assembly; the Z-height of the magnetic heads (0.024 inches); use of flat pack, surface mount and single side signal components on the printed circuit board; mounting the IC chips on the printed circuit board to face the disk drive, and accommodating those IC chips in differentially-sized pockets formed in the lower base plate of the disk drive assembly; and limiting the thickness of the printed circuit board (0.040 inches) and the maximum height of each IC chip formed on the printed circuit board (0.9 mm).

Moreover, as discussed above, this rotary disk storage system allows for reduced part utilization, automated assembly and minimum use of fasteners, which, in turn, provides for lower overall production costs.

While the present invention has been particularly shown and described with reference to certain preferred embodiments, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. A disk drive apparatus comprising a housing having an overall maximum height not greater than 17 mm and including a cover, a lower plate having a top surface and a bottom surface with said cover and said lower plate thereby defining a disk enclosure, and an electronics circuit board having means thereon for providing signal processing to a host computer; at least one storage disk rotatably mounted within said housing; drive means for rotating said at least one storage disk, said drive means being formed integrally with said lower plate wherein said drive means is in the form of a spin motor including a hollow stator hub formed as a one-piece construction with said lower plate; read/write transducer means for writing information on and reading information from said at least one storage disk; support means for supporting said read/write transducer means and for positioning said read/write transducer means at a selected one of a plurality of substantially circular, concentric data tracks on said at least one storage disk; and circuit means for communicating electrical signals between said read/write transducer means and said electronic circuit board wherein said electronics circuit board includes first connection means for providing said drive signals to said drive means, said first connection means including contact pads embedded in said electronics circuit board, and said drive means includes second connection means directly contacting said first connection means for electrically connecting said drive means to said electronics circuit board, said second means including spring finger connections projecting outwardly from said lower plate with each said spring finger connection being an elongated member which is located along a line parallel to the bottom surface of said lower plate, each said spring finger connection contacting one of said contact pads to electrically connect said drive means to said electronics circuit board.

2. The disk drive apparatus of claim 1 and further including tape sealing means for sealing said top cover to said lower plate and for mechanically isolating said top cover from said lower plate such that said top cover floats with respect thereto.

3. The disk drive apparatus of claim 2 wherein said tape sealing means is a pressure sensitive adhesive.

4. The disk drive apparatus of claim 2 wherein said lower plate includes alignment means for properly aligning said top cover with respect to said lower plate, said alignment means including a flanged lip extending upwardly from said lower plate which is aligned with an outer peripheral surface of said top cover such that said top cover is properly positioned to float on said lower plate.

5. The disk drive apparatus of claim 1 wherein electrical windings are mounted on said hub for receiving a current determined by said drive signals.

6. The disk drive apparatus of claim 5 wherein a rotary shaft of a cup-shaped rotor is rotatably positioned in said hollow stator hub.

7. The disk drive apparatus of claim 6 wherein permanent magnets are mounted on said cup-shaped rotor and cooperate with said electrical windings to produce a force of predetermined varying amounts determined by the current supplied to said electrical windings.

8. The disk drive apparatus of claim 7 wherein annular bearings are mounted between said stator hub and said cup-shaped rotor to assist in rotation of said rotor.

9. The disk drive apparatus of claim 1 wherein said electronics circuit board includes IC chips mounted on one side thereof for signal processing and wherein all of the IC chips of said electronics board means face said housing.

10. The disk drive apparatus of claim 9 wherein each of said IC chips is accommodated within differentially-sized pockets formed in the bottom surface of said lower plate when the apparatus is assembled.

11. The disk drive apparatus of claim 1 wherein said read/write transducer means includes at least one data read/write head having a maximum height of not greater than 0.024 inches.

12. The disk drive apparatus of claim 1 wherein said electronics circuit board is a printed circuit board having a maximum thickness not greater than 0.040 inches.

13. The disk drive apparatus of claim 1 wherein said circuit means includes a printed circuit including first electrical conductors for coupling drive current to said drive means and second electrical conductors for coupling signals between said at least one read/write head and said electronics circuit board, said printed circuit being formed on a substrate which is snap-fit to said lower plate thereby supporting said printed circuit within said housing.

14. A disk drive apparatus comprising a housing including a cover, a lower plate having a top surface and a bottom surface with said cover and said lower plate thereby defining a disk enclosure, and an electronics circuit board having means thereon for providing signal processing to a host computer; at least one storage disk rotatably mounted within said housing; drive means for rotating at least one storage disk; read/write transducer means for writing information on and reading information from said at least one storage disk; support means for supporting said read/write transducer means and for positioning said read/write transducer means at a selected one of a plurality of substantially circular, concentric tracks on said at least one storage disk; and circuit means for communicating electrical signals between said read/write transducer means and said electronics circuit board wherein said electronics circuit board includes first connection means for providing drive signals to said disk drive means, said first connection means including contact pads embedded in said electronics circuit board, and said drive means includes second connection means directly contacting said first connection means for electrically connecting said drive means to said electronics circuit board, said second means including spring finger connections projecting outwardly from said lower plate with each said spring finger connection having an elongated member which is located along a line parallel to the bottom surface of said lower plate, each said spring finger connection contacting one of said contact pads to electrically connect said drive means to said electronics circuit board.

15. A disk drive apparatus comprising a housing having an overall maximum height not greater than 17 mm and including a cover, a lower plate having a top surface and bottom surface with said cover and said lower plate thereby defining a disk enclosure, and a printed electronics circuit board having a maximum thickness not greater than 0.040 inches and IC chips mounted on one side thereof for providing signal processing to a host computer, wherein all of said IC chips face said bottom surface of said lower plate; at least one storage disk rotatably mounted within said housing; a spin motor for rotating said at least one storage disk, said spin motor including a hollow stator hub formed as a one-piece construction with said lower plate; at least one date read/write head having a maximum height of not greater than 0.024 inches for writing information on and reading information from said at least one storage disk; support means for supporting said at least one data read/write head and positioning said at least one head at a selected one of a plurality of substantially circular, concentric data tracks on said at least one data read/write head and said printed electronics board wherein said electronics circuit board includes first connection means for providing drive signals to said drive means, said first connection means including contact pads embedded in said electronics circuit board, and said drive means includes second connection means directly contacting said first connection means for electrically connecting said drive means to said electronics circuit board, said second means including spring finger connections protecting outwardly from said lower plate with each said spring finger connection being an elongated member which is located along a line parallel to the bottom surface of said lower plate, each said spring finger connection contacting one of said contact pads to electrically connect said drive means to said electronics circuit board.

16. The disk drive apparatus of claim 15 wherein said circuit means includes a printed circuit including electrical conductors for coupling control signals between said at least one data read/write head and said printed electronics board, said printed circuit being formed on a substrate which is snap-fit to said lower plate thereby supporting said printed circuit within said housing.

17. The disk drive apparatus of claim 16 and further including tape sealing means for sealing said top cover to said lower plate and for mechanically isolating said top cover from said lower plate such that said top cover floats with respect thereto.

18. The disk drive apparatus of claim 17 wherein said tape sealing means is a pressure sensitive adhesive.

19. The disk drive apparatus of claim 15 wherein each of said IC chips is accommodated within differentially-sized pockets formed in the bottom surface of said lower plate when the apparatus is assembled.

20. A disk drive apparatus comprising:
a housing including a top cover and a lower plate having a top surface and a bottom surface;
an electronics circuit board having means thereon for providing signal processing to a host computer;
at least one storage disk rotatably mounted within said housing;
a spin motor for rotating said at least one storage disk and including a hollow stator hub in which electrical windings are mounted, said spin motor being formed as a one-piece construction with said lower plate, and wherein a rotary shaft of a cup-shaped rotor is rotatably positioned in said hollow stator hub, said spin motor further including permanent magnets mounted on said cup-shaped rotor and annular bearings mounted between said stator hub and said cup-shaped rotor to assist in rotation of said rotor;
read/write transducer means for writing information on and reading information from said at least one storage disk;
support means for supporting said read/write transducer means and for positioning said read/write transducer means at a selected one of a plurality of substantially circular, concentric data tracks on said at least one storage disk; and
circuit means for communicating electrical signals between said read/write transducer means and said electronics circuit board wherein said electronics circuit board includes first connection means for providing drive signals to said spin motor, said first connection means including contact pads embedded in said electronics circuit board, and said spin motor includes second connection means directly contacting said first connection means for electrically connecting said spin motor to said electronics circuit board, said second means including spring finger connections protecting outwardly from said lower plate with each said spring finger connection being an elongated member which is located along a line parallel to the bottom surface of said lower plate, each said spring finger connection contacting one of said contact pads to electrically connect said spin motor to said electronics circuit board.

21. The disk drive apparatus of claim 20 and further including tape sealing means for sealing said top cover to said lower plate and for mechanically isolating said top cover from said lower plate such that said top cover floats with respect thereto.

22. The disk drive apparatus of claim 21 wherein said tape sealing means is a pressure sensitive adhesive.

23. The disk drive apparatus of claim 20 and further including alignment means for properly aligning said top cover with respect to said lower plate.

24. The disk drive apparatus of claim 23 wherein said alignment means includes a flanged lip extending upwardly from said lower plate which is aligned with an outer peripheral surface of said top cover such that said top cover is properly positioned to float on said lower plate.

* * * * *